Feb. 17, 1970     E. MATHEY     3,495,335
THICKNESS-MEASURING INSTRUMENT, PARTICULARLY FOR ENAMELLED WIRE
Filed Feb. 2, 1967     3 Sheets-Sheet 1

Inventor:
ERNST MATHEY
By McGlew and Toren
ATTORNEYS

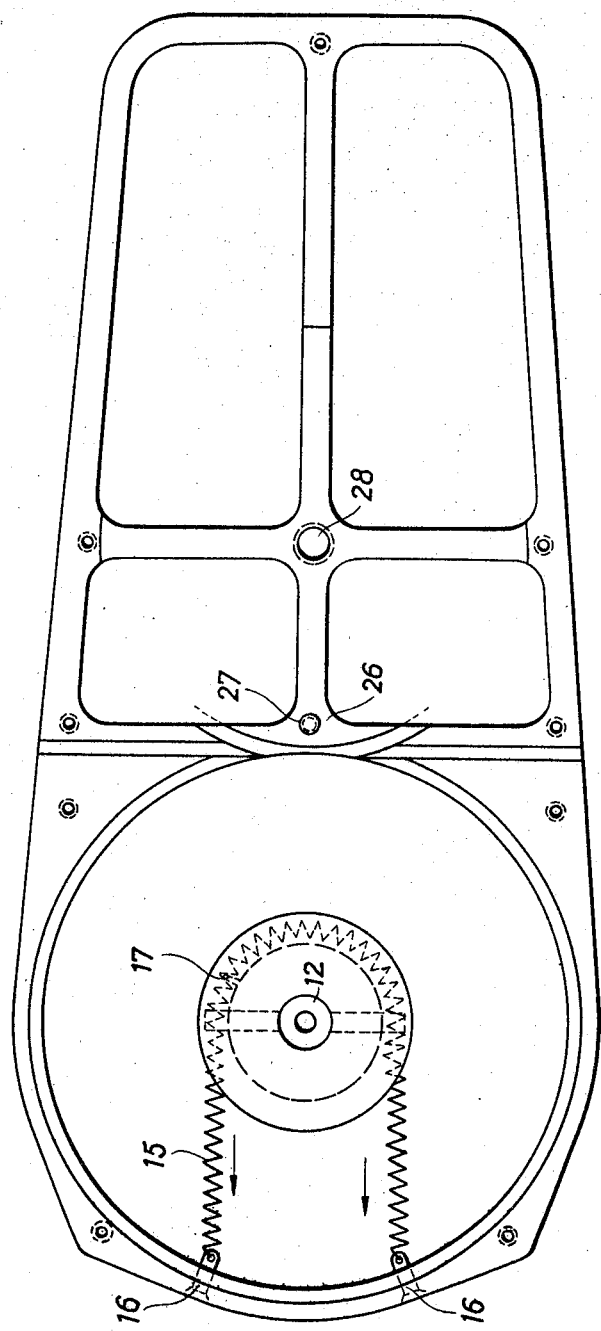

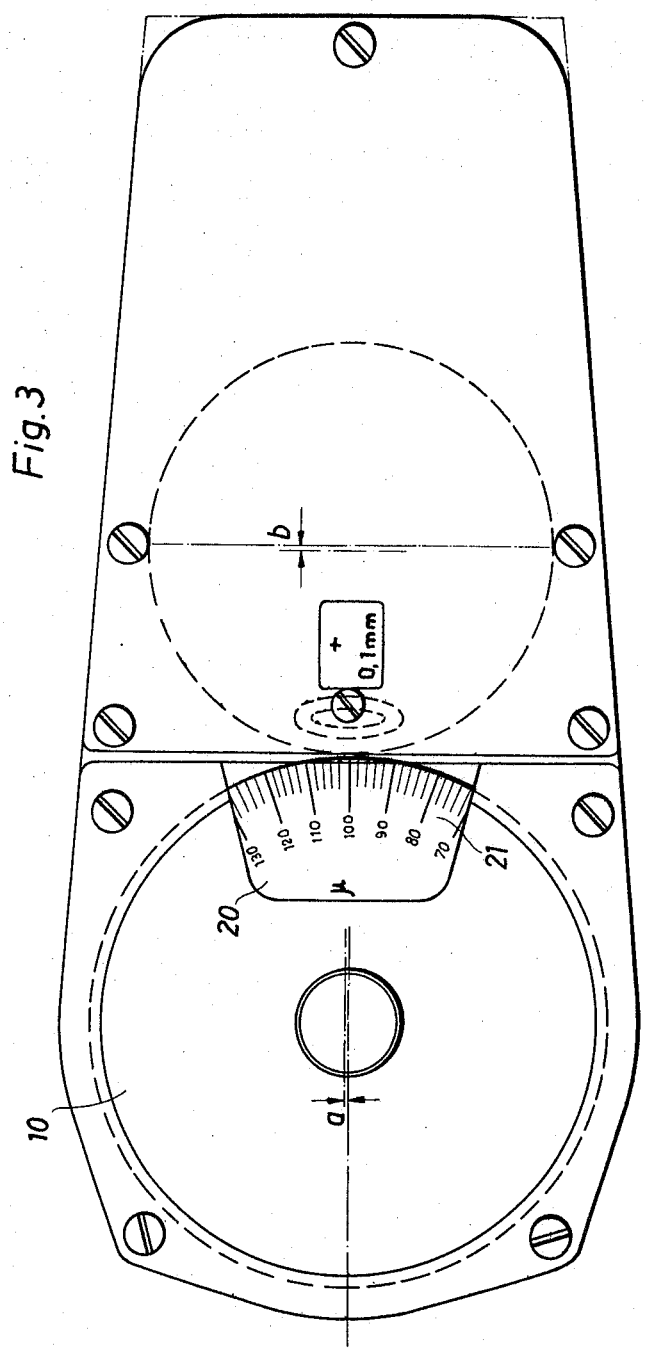

United States Patent Office 3,495,335
Patented Feb. 17, 1970

3,495,335
THICKNESS-MEASURING INSTRUMENT, PARTICULARLY FOR ENAMELLED WIRE
Ernst Mathey, Porz, Wahn, Germany, assignor to Elektro Isolier Industrie Wahn, Wilhelm Ruppert, Wahn, Rhineland, Germany, a German company
Filed Feb. 2, 1967, Ser. No. 613,654
Claims priority, application Germany, Feb. 5, 1966, E 30,997
Int. Cl. G01b 5/00
U.S. Cl. 33—147                                    4 Claims

ABSTRACT OF THE DISCLOSURE

An instrument for measuring the thickness of continuously moving strip material or enamelled wire, which is fed through a gap between an eccentrically rotatable circular measuring disc provided with a readjustment spring and a curved, eccentrically mounted counter member. The disc contains a scale on its face which enables direct measurement readings as wire is passed through the gap. The counter is eccentrically mounted and is simply adjustable to various measurement ranges and can be locked to prevent any change in position which would affect the accuracy of the measurement.

---

The invention relates to an instrument for measuring the thickness of continuously moving filamentous or ribbon-shaped material, such as for enamelled wire, which is fed through a gap between an eccentrically rotatable disc provided with a re-adjusting spring and a curved, eccentrically mounted counter member. There is already known a wire-measuring instrument with mechanical gearing in which two vertical measuring rollers are positioned in a stand, and a counter-measuring roller, in the form of a measuring-bridge, is suspended for oscillation by means of spring-steel strips so that it is adjustable on the parallelogram principle and can follow the varying thicknesses of the wire. By means of the arrangement the horizontal axle position is maintained. This instrument is concerned with an embodiment which, according to a technical report, had not yet been put into practical use. Moreover another measuring instrument for continuously measuring the diameter of tubing is known in which, in addition to a pair of squeeze rollers and conveyor rollers, eccentrically rotatable discs are also used as measuring or counter-measuring members. In this instrument, both discs are suspended elastically by means of torsion springs and the rim of the disc is constructed in the form of an Archimedean spiral. The wire-thickness sensed at the confines of this spiral is measured electrically, that is potentiometrically, through an integrating circuit. This embodiment entails a high construction cost, it requires an unusual disc form, and it is also difficult to convert such an embodiment to other measuring ranges as is frequently necessary in practice.

The invention has the object of providing a measuring instrument of new spatial form which has a sturdy construction; can be manufactured cheaply, enables direct reading, is easily adjustable to various measuring ranges, restricts any unauthorized setting of the accuracy of measurement and the spring strength.

According to the invention a thickness-measuring instrument is proposed in which the reading arrangement is arranged on a disc having an adjustable return spring enclosing the disc spindle holder. A measuring gap is formed between a disc and a counter-chamber which is movable in stages as a counter disc in the instrument housing and is fixedly positionable by means of holding parts such as a clamping screw and a holding screw. There is no special guide for the discs or construction of their rims. Only one of the discs needs a return spring. By this separation of the individual functions the counter-disc may be more easily set for a new measuring range. The reading accuracy, even with varying wire-diameters, remains practically the same. More easily than hitherto, the measuring range can be extended as necessary. A compact sturdy construction is obtained and it is not necessary to anchor the measuring instrument in a stand or to use it exclusively as a stationary instrument. The instrument does not require any electrical parts. In order to alter the measuring range more easily as desired there is provided in a simple manner on the spindle holder a catch-block for holding a spring-actuation. Another embodiment provides that the counter-member is carried out in the form of an anvil which in the individual case leads advantageously to having of material. Protection of the reading arrangement of the scale is afforded along with more convenient reading by means of a window located above a scale on the measuring disc or the counter-disc. A simplified presentation of the counter-disc contains a slot for guiding the clamping screw which permits a continuous setting of the range and a reliable adjustment even during abrupt temperature changes. Further the measuring disc and counter-disc can be constructed with a removable cover, preferably containing a window. The invention will now be described with reference to the accompanying drawings, which show an embodiment of the invention but in no restrictive sense.

FIGURE 2 is a plan view on FIGURE 1 with the cover of the instrument removed, and FIGURE 3 is a plan view of the instrument with the cover in place.

Figure 1:
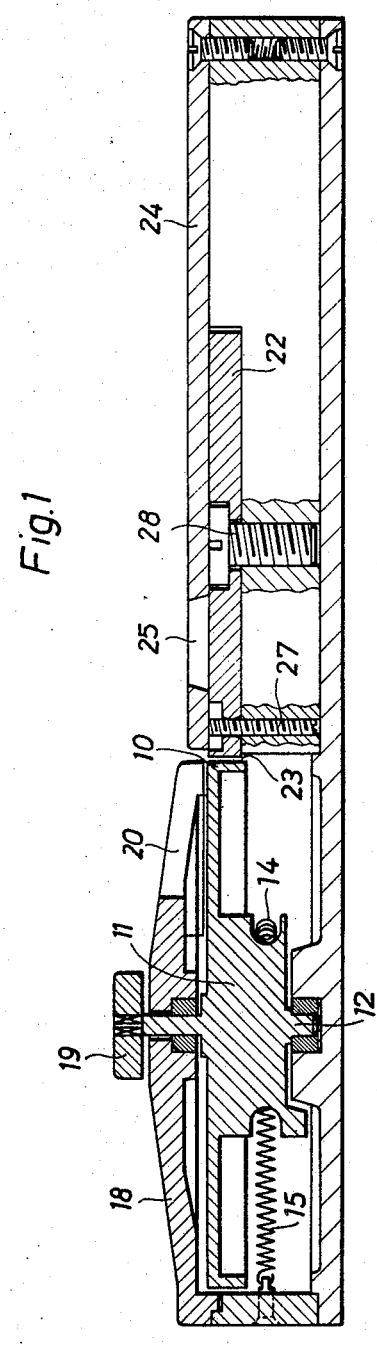
FIGURE 1 is a longitudinal section through the thickness measuring instrument.

A circular measuring disc 10 is fixed to the upper stepped end of a spindle-holder 11 from which a spindle 12 extends downwardly and is mounted within the casing of a measuring instrument. The parts 10, 11, 12 form one piece. The rotatable measuring disc is mounted in the casing to rotate eccentrically (cf. FIGURE 3). Extending about the periphery of the spindle-holder 11 is an annular groove 14 arranged to receive a tension spring 15 which, in FIGURE 2, is secured at its outer end to pins 16. The spring 15 around the spindle-holder and thus, in an advantageous way, effects a unilateral pressure on the bearing pin which excludes a bearing movement of the measuring disc. Alteration of the returning force of the spring acting on the measuring disc can be effected changing the point of attachment of the spring to a holding part, such as a catch-plate 17, on the spindle-holder 11. The measuring disc is limited against upward movement by a cover 18 which is fixed axially to the disc through the knob 19. In the cover 18 a window 20 is provided through which a scale 21 located at the periphery of the measuring disc can be read.

Preferably the catch-plate 17 is soldered in the groove of the spindle-holder (FIGURE 2).

The counter-member, either an anvil or a counter-disc 22, forms with its rim a slit or gap 23 with the measuring disc into which the wire to be measured (not shown) is inserted. The counter-disc can be covered by a lid-shaped part 24, preferably provided with a window 25, which is removable for making alterations in the position of the disc. As is shown dotted in FIGURE 3, a slot 26 can be provided for a clamping screw 27, see FIG. 2 (adjustment easy—even during great variations in temperature) while the disc 22 itself is fixed by means of a holding-screw 28 secured in a part of the casing.

The instrument works preferably in three measuring ranges for the following wire-thicknesses: 0.05–0.15 mm.; 0.15–0.25 mm.; 0.25–0.35 mm. For adjusting the counter-disc 22 the cover part 24 is taken off, the holding screw 28 is slackened and the clamping screw 27 is released. The counter disc is mounted eccentrically, see FIG. 3, and it is manually rotated until the proper distance is established across the gap 23 between the counter disc and the measuring disc. Next, the clamping screw 27 is tightening for holding the counter-disc in position in the casing against any displacement for subsequent measurements and the holding screw is also tightened.

On the other hand, however, the spring 15 can be set or reset to a different tension as desired. For this operation the knob 19 is released, the cover 18 and then the spindle-holder 11 removed, whereby the spring-ends need not be removed from the pins 16. In this way the spring strength can be set easily as desired. This instrument ensures an accuracy of measurement of $\pm 2\mu$ and less. The manufacture of the instrument is simplified by making one or both of the measuring discs as simple circular discs. The window, as is known in another connection, is covered with a transparent foil and can be provided with a lens or the like for better reading. Due to the arrangement of the spring 15 consideration is taken of an important technical measurement requirement in that the return force acting on the measuring disc and the frictional force between the surface of the material being measured and the face of the measuring disc are opposed and will be equally great.

According to the embodiment illustrated, the measuring range corresponds to a half-turn of the disc (180°), cf. FIGURE 3. If the diameter of the measuring disc is 50 mm. for example and the mounting is displaced from the middle of the disc by 0.05 mm., there thus appear in the middle of the measuring range divisions for $2\mu$ alteration in thickness at a distance of more than 1 mm. so that the alterations in thickness of $2\mu$ are exactly readable without difficulty. A further advantage consists in the fact that strips, filaments and wires at only slight measuring pressure at run-off speeds of 4–5 metres per second for example, are satisfactorily measurable.

During measuring operations the wire or material to be checked is fed into the gap 23 between the discs. The counter-disc is stationary, however, when the wire contacts the measuring disc it will be rotated about its axis until the dimension of the gap corresponds to the diameter of the wire. As the wire is passed through the gap, the measuring disc will be rotated until the gap is of a sufficient dimension to permit the passage of the wire therethrough. The reading on the scale, showing the displacement of the measuring disc from any fixed zero-point, will indicate the dimension of the wire and is determined by adding the scale reading to the minimum gap opening. The scale can be arranged to afford a direct dimension reading. The return force of the spring will return the measuring disc as the diameter of the wire decreases while the frictional contact between the wire and the disc will rotate the measuring disc into the proper measuring position.

The invention can also be varied in such a way that the scale on the measuring disc is rotatable or adjustable as it is eccentrically adjustable.

I claim:

1. An instrument for measuring the thickness of filamentous strip and wire material, comprising a casing, a circular measuring disc eccentrically rotatably mounted in said casing and having a peripheral circumferential edge surface, a counter member having an edge surface being disposed in spaced facing relationship with the circumferential edge surface of said measuring disc and forming a slit therebetween arranged to receive the material to be measured, said counter member being adjustably positionable within said casing relative to said measuring disc for varying the slit dimension therebetween, said measuring disc having a scale formed on its surface about a portion of its circumferential edge, a spindle extending axially from said measuring disc for rotatably mounting said disc in said casing, a catch plate being secured to and extending laterally from said spindle, a tension spring being positioned about and in contact with said spindle and being secured to said casing, said tension spring being in interengaged contact with said catch plate for biasing said disc against the feed of material through the slit between said measuring disc and said counter member, means for securing said counter member in a stationary position during the passage of the material through the slit between said counter member and measuring disc, whereby said counter member is set in position relative to said measuring disc to establish a selected determinable slit dimension so that as material to be measured is passed through the slit and its transverse dimension exceeds the selected slit dimension said eccentrically rotatable measuring disc rotates due to the frictional contact with the material until the transverse dimension of the slit coincides with the transverse dimension of the material and the dimension is determinable by reading the scale on said measuring disc.

2. An instrument for measuring thickness, as set forth in claim 1, wherein said spindle having an annular groove formed therein in a plane parallel to the plane of said disc, said catch plate being secured to said spindle within said groove, and said tension spring being positioned in said annular groove about said spindle.

3. An instrument for measuring thickness, as set forth in claim 1, wherein an extension of said spindle extends axially from said disc from the side thereof opposite to the side from which said spindle extends for rotatably mounting said disc in said casing, a cover member fitted on said extension and supported about at least a portion of its periphery on said casing so that said extension is rotatable with said disc relative to said cover, a knob fitted onto said extension for securing said cover to said disc for preventing displacement of said disc from said casing, and a window formed in said cover for reading the scale on said disc.

4. An instrument for measuring thickness, as set forth in claim 3, wherein said means for securing said counter member comprising a holding screw extending through said counter member for securing said counter member to said casing, a lid-shaped part removably fitted to said casing and covering said counter member, and a window in said lid-shaped part for viewing said counter member.

References Cited

UNITED STATES PATENTS 1,803,284    4/1931    Parkhurst et al.
2,268,521   12/1941    Wilson et al.
3,155,109   11/1964    Anthon.

FOREIGN PATENTS 492,086    3/1919    France.

SAMUEL S. MATTHEWS, Primary Examiner